US008318283B2

(12) United States Patent
Hsu

(10) Patent No.: US 8,318,283 B2
(45) Date of Patent: Nov. 27, 2012

(54) BLOW MOLD AND BACKFILL MANUFACTURING PROCESS

(75) Inventor: James Hsu, Jiangsu (CN)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 13/048,449

(22) Filed: Mar. 15, 2011

(65) Prior Publication Data

US 2011/0165368 A1 Jul. 7, 2011

Related U.S. Application Data

(63) Continuation of application No. 11/538,414, filed on Oct. 3, 2006, now Pat. No. 7,922,944.

(60) Provisional application No. 60/723,081, filed on Oct. 3, 2005.

(51) Int. Cl.
*B32B 3/06* (2006.01)
*B32B 3/08* (2006.01)
*B32B 5/18* (2006.01)

(52) U.S. Cl. ........................................ 428/71; 428/136

(58) Field of Classification Search .................... 428/71, 428/99, 136

See application file for complete search history.

(56) References Cited

U.S. PATENT DOCUMENTS

| | | |
|---|---|---|
| 3,161,436 A | 12/1964 | Hood |
| 3,487,134 A | 12/1969 | Burr |
| 3,773,875 A | 11/1973 | Lammers |
| 4,115,170 A | 9/1978 | Sanson |
| 4,244,764 A | 1/1981 | Ginsburg |
| 4,248,646 A | 2/1981 | Ginsburg |
| 4,268,557 A * | 5/1981 | Bracesco ........................ 428/71 |
| 4,575,152 A | 3/1986 | McLaughin, Sr. |
| 4,597,606 A | 7/1986 | Magee |
| 4,738,809 A | 4/1988 | Storch |
| 4,829,644 A | 5/1989 | Kondo et al. |
| 4,923,653 A | 5/1990 | Matsuura et al. |
| 5,098,622 A | 3/1992 | Lilienthal et al. |
| 5,127,813 A | 7/1992 | Omata et al. |
| 5,164,137 A | 11/1992 | Omata et al. |
| 5,275,779 A | 1/1994 | Marfilius et al. |
| 5,328,651 A | 7/1994 | Gallagher et al. |

(Continued)

FOREIGN PATENT DOCUMENTS

FR  2801830  6/2001

*Primary Examiner* — Alexander Thomas
(74) *Attorney, Agent, or Firm* — Conley Rose, P.C.; Kristiin Jordan Harkins

(57) ABSTRACT

Disclosed embodiments may include methods for forming a foam product comprising forming a skin and inserting a bracket at least partially into the skin. Another embodiment method for manufacturing a foam product may comprise sealing a tube of material in a cavity of a mold, blowing air into the tube of material to form a skin comprising an interior surrounded by a wall, cutting an incision in the skin wall, inserting a bracket through the incision and into the skin interior, filling the skin interior with foam, and curing the foam. Disclosed embodiments may further include foam product comprising a skin with an interior surrounded by a wall, a bracket within the skin interior, a foam substantially filling the skin interior and securing the bracket in place, a recessed region configured to mate with a mounting assembly on a chair, and an incision in the skin wall, the incision positioned outside of the recessed region.

20 Claims, 6 Drawing Sheets

U.S. PATENT DOCUMENTS

| | | |
|---|---|---|
| 5,700,050 A | 12/1997 | Gonas |
| 6,124,009 A | 9/2000 | Havens |
| 6,409,947 B1 | 6/2002 | Wandyez |
| 6,419,863 B1 | 7/2002 | Khac |
| 6,746,085 B1 | 6/2004 | Nelson |
| 6,890,462 B2 | 5/2005 | Panczyk et al. |

* cited by examiner

BLOW MOLD AND BACKFILL MANUFACTURING PROCESS

CROSS-REFERENCE TO RELATED APPLICATIONS

The present application is a continuation of and claims benefit under 35 USC §120 to co-pending U.S. Pat. No. 7,922,944, issued Apr. 12, 2011 (U.S. patent application Ser. No. 11/538,414, filed Oct. 3, 2006) entitled "Blow Mold and Backfill Manufacturing Process" which in turn was related to and claimed the benefit under 35 U.S.C. §119 of U.S. Provisional Application Serial No. 60/723,081 filed Oct. 3, 2005 and entitled "Blow Mold and Backfill Manufacturing Process," all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to an improved method for manufacturing an armrest for an office chair.

BACKGROUND

Office chairs have armrests attached to arms extending up from the frame of the chair. An armrest generally comprises an outer covering or skin and a foam interior filling. To provide additional support for the armrest, a bracket is generally inserted into the skin prior to filling the skin with foam. Once the bracket is inserted into the skin, the foam is blown into the armrest such that the foam fills the skin and fixes the position of the bracket within the skin. Generally, the skin is formed by injecting liquid polymer into a mold and allowing the liquid polymer to harden. A hole is then cut into the skin through which the bracket and foam can be inserted into the skin. The hole is cut in the underside of the skin through a recessed region that mates with the arm of the chair, thereby hiding the parts of the skin through which the bracket and foam are inserted. Such a configuration improves the aesthetic look of the armrest when it is installed on the chair.

The aforementioned manufacturing process has several disadvantages. First, the process uses liquid polymer material to create the skin, which may result in an unacceptable number of defective skins. Second, the process includes cutting a hole in the skin and removing material from the skin for the bracket to be inserted therein, which is an error-prone and time-consuming process. Finally, the process cannot reliably produce asymmetrical armrests, which contain brackets that are wider than the recessed region, because attempting to insert such brackets through the aforementioned hole frequently tears the skin, rendering it useless. Therefore, a need exists for an armrest manufacturing process than (1) eliminates the use of liquid skin material; (2) eliminates the need to remove material from the skin to insert the bracket into the skin; and (3) produces an armrest with a bracket that is wider than the recessed region of the armrest without detracting from the overall aesthetic look of the armrest.

SUMMARY OF THE INVENTION

In one aspect, a method for forming a foam product comprises forming a skin comprising a mounting area and a bracket insertion area separate from the mounting area, and inserting a bracket at least partially into the skin through the bracket insertion area, wherein the mounting area is configured to receive a mounting assembly attached to an article of furniture. In embodiments, the method may further comprise filling the skin with foam, and/or sealing the bracket insertion area after inserting the bracket. In various embodiments, at least a portion of the bracket is wider than the mounting area, or the foam product is asymmetrical, or no material is removed from the skin to insert the bracket into the skin, or the skin is formed without using a liquid skin material.

In another aspect, a method for manufacturing a foam product comprises sealing a tube of material in a cavity of a mold, blowing air into the tube of material to form a skin comprising an interior surrounded by a wall that conforms to the shape of the cavity, cutting an incision in the skin wall, inserting a bracket through the incision and into the skin interior, filling the skin interior with foam, and curing the foam. In one embodiment, the method further comprises removing the skin from the mold and trimming excess material from the skin. In another embodiment, the method further comprises sealing the incision. In various embodiments, the bracket is inserted without removing any material from the skin wall, or the skin comprises a recessed region configured to mate with a mounting assembly, or the bracket is wider than the recessed region, or the foam product is an asymmetrical foam product. In another embodiment, the skin further comprises a bracket insertion area located outside of the recessed area, wherein the incision is located in the bracket insertion area.

In yet another aspect, a foam product is disclosed comprising a skin comprising an interior surrounded by a wall, a bracket positioned within the skin interior, a foam substantially filling the skin interior and securing the bracket in place within the skin wall, a recessed region formed in the underside of the foam product, the recessed region configured to mate with a mounting assembly on a chair, and an incision in the skin wall, the incision positioned outside of the recessed region. In various embodiments, the incision is located in a bracket insertion area positioned outside of the recessed region, or the incision is wider than the recessed region, or the incision does not remove any material from the skin, or the foam product is asymmetrical.

Other aspects and advantages will be apparent from the following description and the appended claims. The various characteristics described above, as well as other features, will be readily apparent to those skilled in the art upon reading the following detailed description, and by referring to the accompanying drawings.

BRIEF DESCRIPTION OF THE DRAWINGS

For a more complete understanding of the disclosure, and for further details thereof, reference is now made to the accompanying drawings, in which.

DETAILED DESCRIPTION

The Blow Mold and Backfill Manufacturing Process is an improved method for manufacturing foam products, such as an armrest for a chair. More specifically, the Blow Mold and Backfill Manufacturing Process is a quick and easy process for mass producing foam products comprising a skin that surrounds polymeric foam and a bracket that supports the foam product. The Blow Mold and Backfill Manufacturing Process is advantageous because: it eliminates the use of liquid skin material in the skin, forming process, it eliminates the need to remove material from the skin to insert the bracket into the skin, and it allows asymmetrical foam products to be produced, unlike prior art manufacturing processes.

Figure 1:
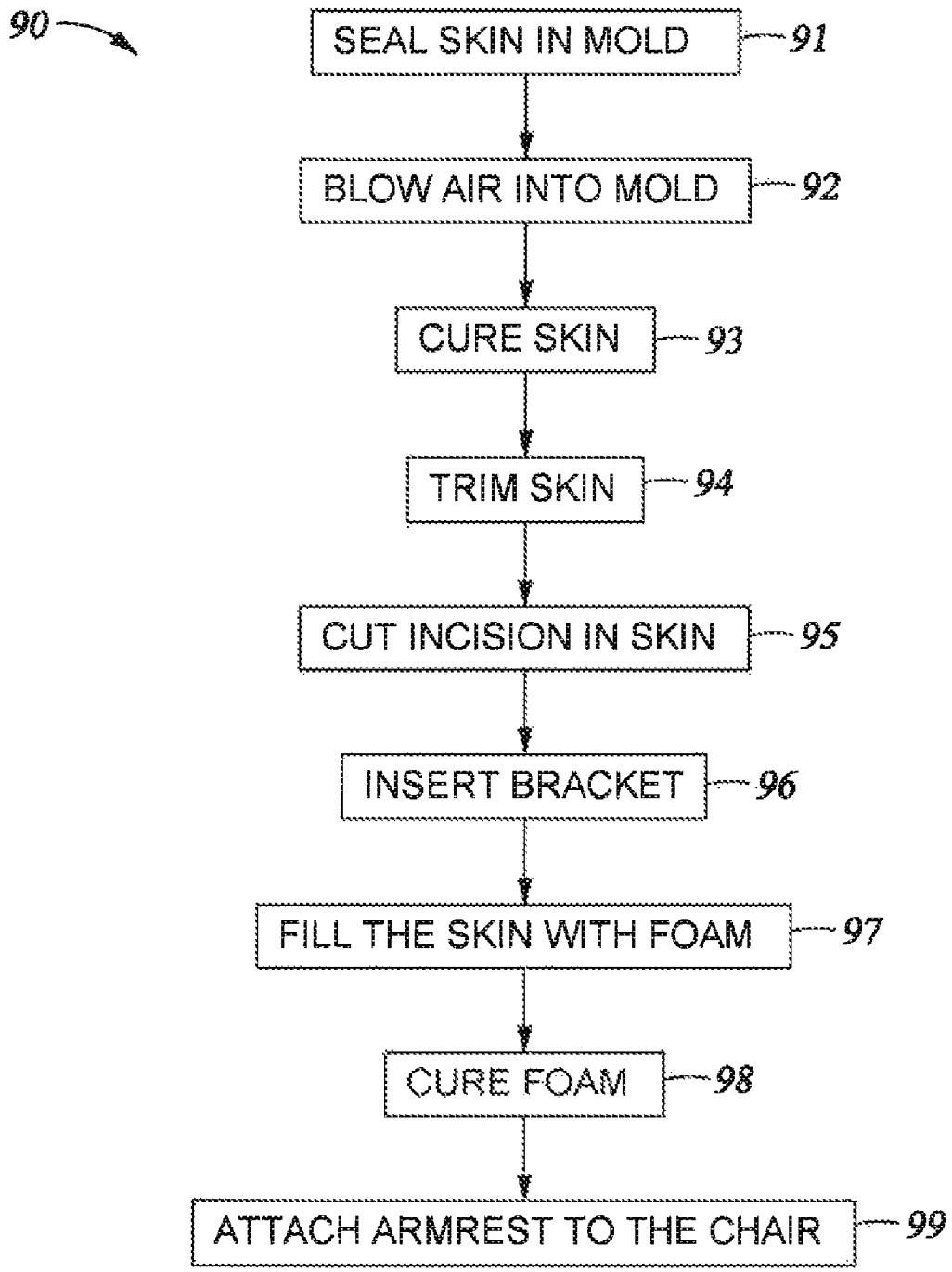
FIG. 1 is a flowchart of one embodiment of the Blow Mold and Backfill Manufacturing Process.

An overview flow chart for one embodiment of the Blow Mold and Backfill Manufacturing Process is illustrated in FIG. 1. As explained, in further detail herein, the method 90 comprises creating a skin for the foam product skin, as follows: sealing the skin in the mold at 91, blowing air into the mold at 92, curing the skin at 93, and trimming the skin at 94. The method 90 further comprises manufacturing the foam product as follows: cutting an incision in. the skin at 95, inserting a bracket into the skin at 96, backfilling the skin with foam at 97, and curing the foam at 98. If the foam product is an armrest, the method 90 further comprises attaching the armrest to the arm of a chair at 99.

Blow molding is one process for manufacturing a skin for foam products. The blow molding process described herein starts with the selection of a skin material. Several types of skin material are suitable for use in the Blow Mold and Backfill Manufacturing Process. For example, the skin may be polyvinyl chloride (PVC), polyvinyl acetate (PVA), polyurethane, polyethylene, polyester, or any other polymeric sheet material. In other embodiments, the skin may be leather, natural rubber, synthetic rubber, latex, or a thermoplastic elastomer (TPE). TPE materials have the advantages of being flexible enough to conform to complex mold shapes without tearing and retaining a complex mold shape when cured. A TPE skin may be in the form of an extruded or otherwise formed tube of skin material. When the skin is in tube form, it aids in the facilitation. of the blow mold process, as described below.

Figure 2:
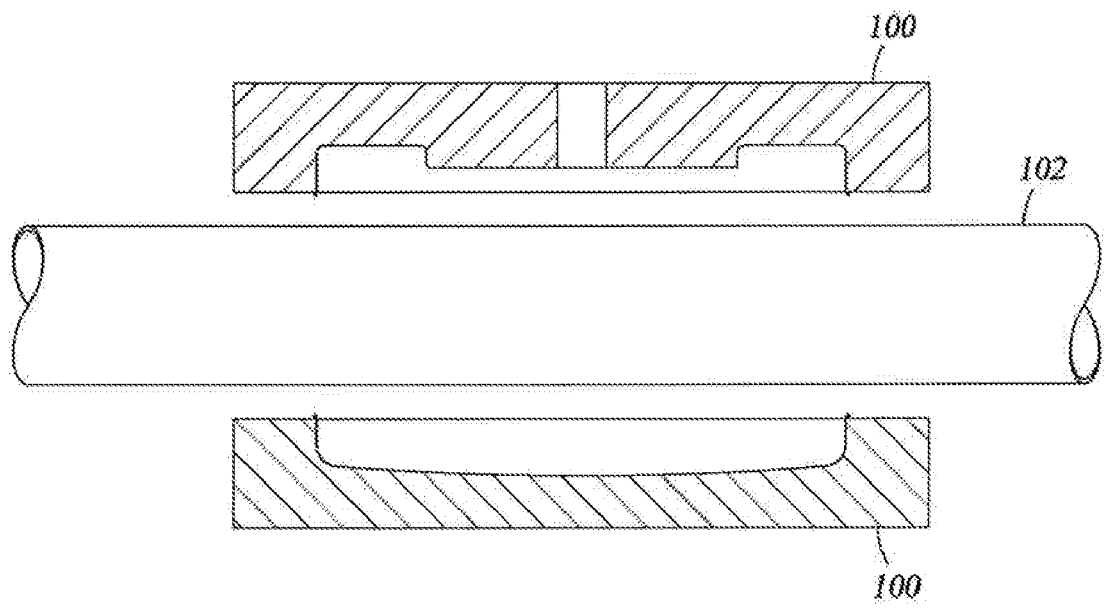
FIG. 2 is a cross-sectional side view of one representative embodiment of a skin positioned between two parts of a mold.
Figure 3:
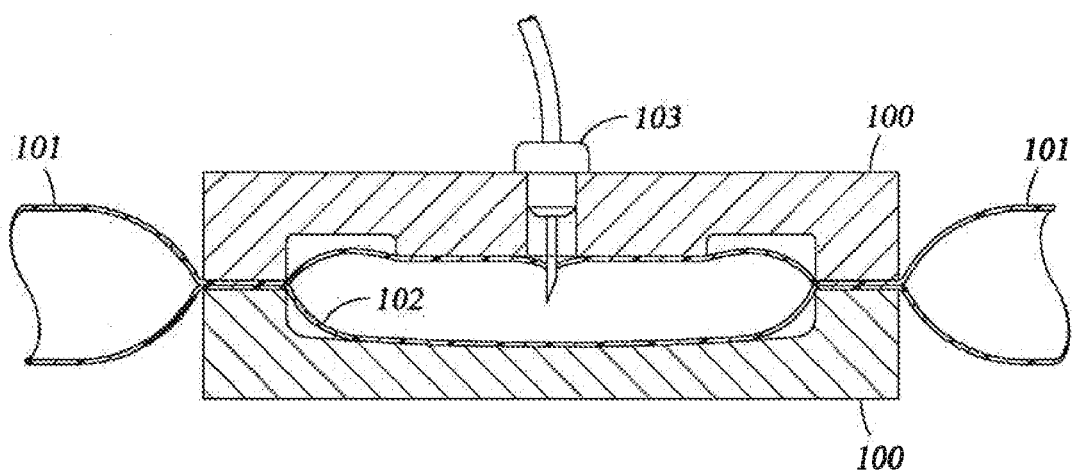
FIG. 3 is a cross-sectional side view of one representative embodiment of a skin sealed within a mold.

Referring now to FIG. 1 and FIG. 2, the method 90 begins at 91 with the sealing of a skin 102 within a mold 100. The skin 102 is sealed in the mold 100 by first positioning the skin 102 between the two mold halves, as shown in cross-section in FIG. 2, then closing the mold 100 as shown in FIG. 3. The skin 102 shown in FIG. 2 is in the tube form described above. Persons of ordinary skill in the art will appreciate that the mold 100 may have more than the two parts described herein. As shown in FIG. 3, the mold 100 is then closed so that the skin 102 is captured within the cavity in the mold 100. Closing the mold pinches the skin 102 at the two ends of the tube, thereby producing two pieces of excess material 101 extending outwardly from the mold 100. Once the mold 100 is closed, the two pieces of excess material 101 are no longer considered part of the skin 102.

One reason why the Blow Mold and Backfill Manufacturing Process is advantageous is because it eliminates the need to blow liquefied polymeric skin material into the interior of the mold 100. Several of the prior art processes blow liquid polymer into the interior of the mold 100 to create a skin. However, when liquid polymer is blown into the interior of the mold, the liquid polymer may not completely coat the interior of the mold, leaving a hole in the skin. When this occurs, the skin is not usable and another skin must be created. By contrast, the Blow Mold and Backfill Manufacturing Process uses a tube of polymeric material that eliminates the need to use liquid polymer to create the skin. The use of the tube of polymeric material produces a higher percentage of acceptable skins than the prior art processes.

After the skin 102 is sealed in the mold 100, air is blown into the skin 102 per 92 of method 90 so that the skin 102 takes the shape of the interior of the mold 100. An injection needle 103 is then inserted through the mold 100 such that the injection needle 103 penetrates the skin 102 as shown in FIG. 3. The injection needle 103 then injects air into the skin 102, thereby inflating the skin 102 until the skin 102 takes the shape of the cavity within the mold 100. If desired, the mold 100 can be configured with a plurality of vent holes (not shown) that allow the air between the walls of the mold cavity and the skin 102 to escape the mold 100 when the skin 102 is filled with air.

Figure 4:
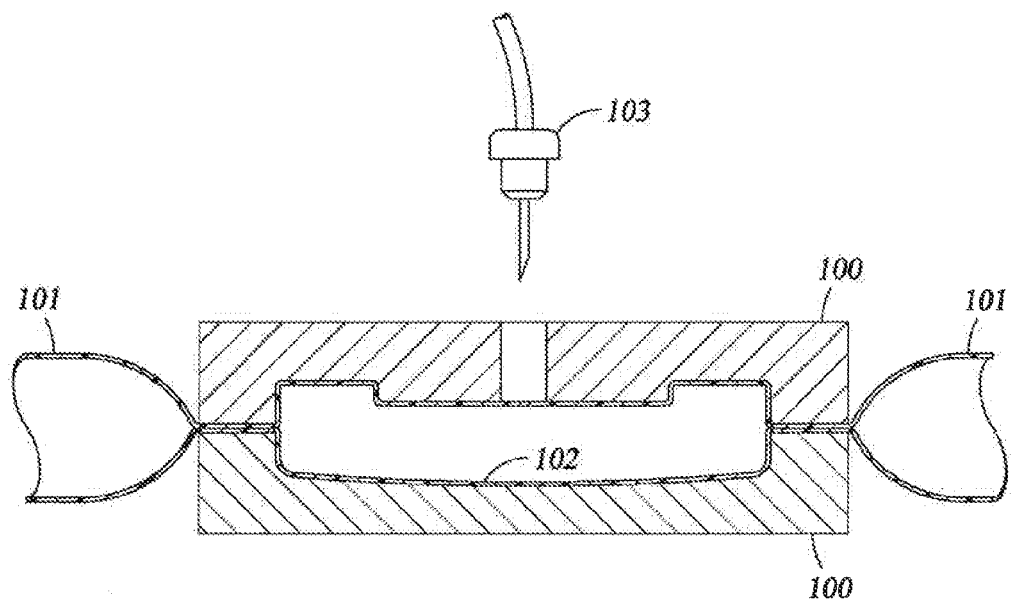
FIG. 4 is a cross-sectional side view of one representative embodiment of a skin inflated with air.

After the skin 102 is filled with air, the skin 102 is cured in the mold per 93 of method 90. Curing the skin 102 in the mold 100 sets the shape of the skin 102. In one embodiment, the skin 102 is cured using heat. More specifically, the skin 102 is heated to an elevated temperature, and then cooled to ambient temperature to set the shape of the skin 102. In other embodiments, the skin 102 is cured using infrared or ultraviolet radiation, radio frequencies, chemical compounds, or time. The injection needle 103 may be removed prior to the curing process, or may remain inserted into the skin 102 during the curing process to regulate the air pressure within the skin 102. If the injection needle 103 remains within the skin 102 during the curing process, the injection needle 103 is removed after the curing process is substantially completed. FIG. 4 is an illustration of the mold 100 and the skin 102 after the skin has been cured and the injection needle 103 removed from the mold 100.

Figure 5:
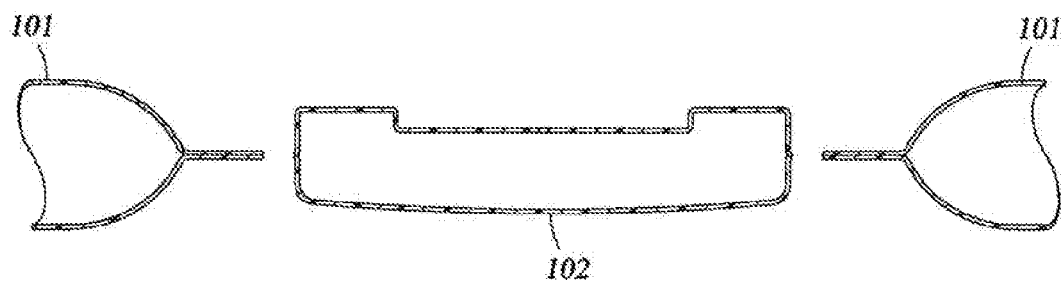
FIG. 5 is a cross-sectional side view of one representative embodiment of a trimmed skin.

After the skin 102 is cured, the skin 102 is removed from the mold 100 and trimmed per 94 of method 90. To remove the skin 102 from the mold 100, the two halves of the mold 100 are opened and the skin 102 is ejected or otherwise removed from the mold 100. The excess material 101 is then cut or otherwise separated from the skin 102. The excess material 101 can be cut using a knife, saw, hot wire, laser, or any other cutting means. FIG. 5 shows the skin 102 removed from the mold 100 and the two pieces of excess material 101 removed from the skin 102.

Figure 6:
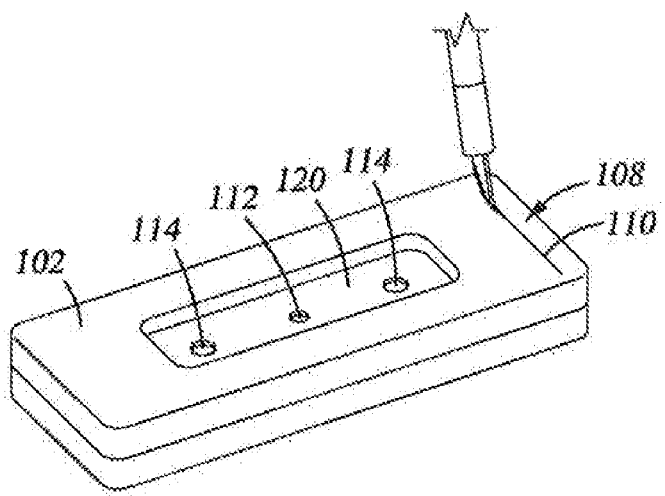
FIG. 6 is a perspective view depicting an aperture being cut in a skin.

FIG. 6 is a perspective view of an example of a skin 102 produced by the blow molding process described above. The underside of the skin 102 contains a recessed region 120 that is sized and configured to mate with the arm of a chair (not shown). The recessed region 120 contains a plurality of dimples 114 that indicate where the attachment screws are to penetrate the skin 102 to mate with the screw apertures 116 depicted in FIG. 7. The recessed region 120 also contains an aperture 112 where the injection needle 103 penetrated the skin 102 and inflated the skin 102 with After the skin 102 is formed by the aforementioned blow molding process, an incision is cut into the skin 102 per 95 of method 90. FIG. 6 shows an incision 110 being cut into the skin 102. The incision 110 is used to insert the bracket (not shown in FIG. 6) into the interior of the skin 102. The incision 110 allows the skin 102 to be distorted when pressure is applied to the sides of the skin 102. The pressure on the skin 102 creates an aperture in the skin 102, thereby allowing the bracket 104 to be inserted into the skin. However, when the pressure is released from skin 102, the incision 110 closes and the aperture disappears such that the two sides of the incision 110 are adjacent to each other. In one embodiment, the incision 110 extends past the underside of the skin 102 such that the skin 102 may be folded in half along the incision plane. In another embodiment, the underside of the skin 102 may also contain a bracket insertion area 108 as shown in FIG. 6. The bracket insertion area 108 is a second recessed region in the underside of the skin 102 that is used to insert the bracket into the skin 102. If the skin 102 is configured with the bracket insertion area 108, then the incision 110 may be made through the bracket insertion area 108 as shown in FIG. 6. However, persons of ordinary skill in the art will appreciate that the incision 110 is not necessarily located in the bracket insertion area 108. Persons of ordinary skill in the art will also appreciate that the incision 110 may not necessarily be located on the underside 120 of the skin 102, but may also be located on the sides, top or a combination of bottom, sides, and/or top of the skin 102.

Figure 7:
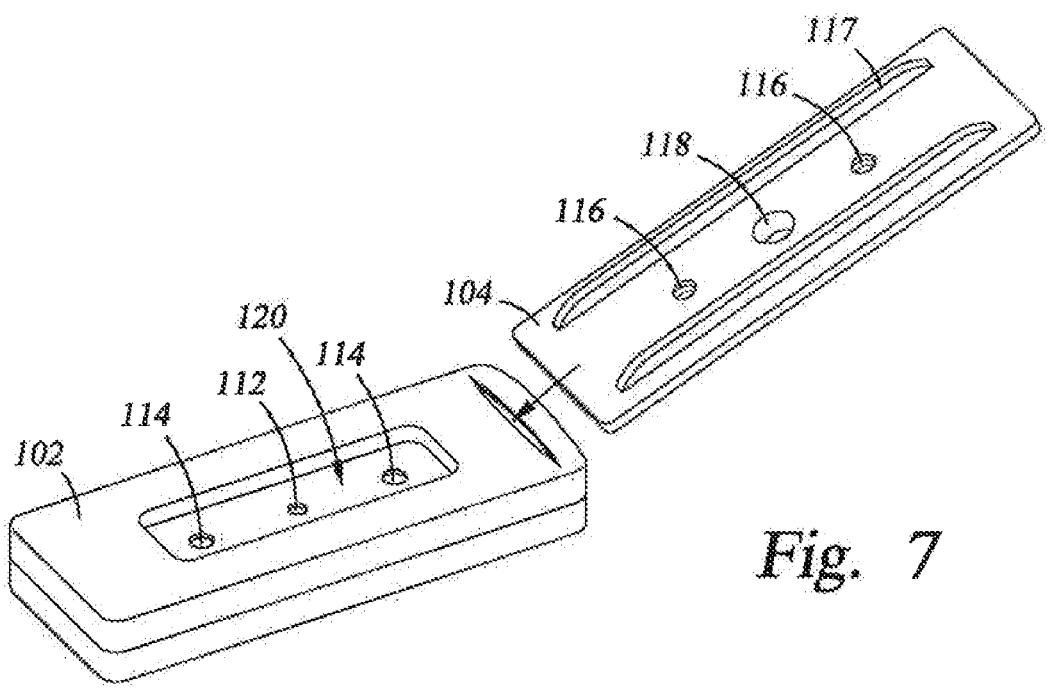
FIG. 7 is a perspective view depicting a bracket being inserted into a skin.

After the incision 110 is made in the skin 102, the bracket is inserted into the skin per 96 of method 90. FIG. 7 is a perspective view of an example of the bracket 104 being inserted into the skin 102. Due to the elastomeric nature of the skin 102, the skin 102 will stretch and bend to allow the bracket 104 to be inserted into the interior of the skin 102 through the incision 110. The stretching and bending of the skin 102 helps the bracket 104 to he inserted because the bracket 104 may be wider than the incision 110. The bracket 104 is configured to be approximately the same shape, but slightly smaller than, the skin 102. The configuration of the bracket 104 allows the bracket to support the majority of the armrest, but still allows the foam to occupy enough space between the top, bottom, and sides of the bracket 104 and the skin 102 such that the user is unable to feel the bracket 104 though the skin 102 when manufacture of the foam product is completed.

Another reason Why the Blow Mold and Backfill Manufacturing Process is advantageous is because it allows manufacturers to produce armrests without the need to remove any material from the skin of the armrest. The prior art manufacturing processes require that at least one area of the skin be removed so that the bracket can be inserted into the skin. At least one area of the skin must be removed because the recessed region is substantially narrower than the bracket and the bracket tears the skin when at least one area of the skin is not removed. Eliminating the need to remove any portion of the skin of the armrest reduces the number of steps required to manufacture the foam product and the amount of waste material produced by the manufacturing process. By reducing the number of manufacturing steps, the manufacturing time and cost of the armrest is reduced and the overall efficiency of the manufacturing process is increased.

As shown in FIG. 7, the bracket 104 contains a foam aperture 118 and a pair of screw apertures 116. The foam aperture 118 is sized and configured to allow the foam injection needle (not shown in FIG. 7) to pass though the bracket 104 unimpeded when the bracket 104 is fully inserted into the skin 102. The screw apertures 116 are sized and configured such that a pair of self-tapping screws (not shown in FIG. 7) can be inserted through the dimples 114 in the skin 102 and mate with the screw apertures 116 to secure the foam product in place. The bracket 104 also contains a plurality of supportive ribs 117 that provide rigidity and support for the bracket 104 and, consequently, the finished foam product. Persons of ordinary skill in the art will appreciate that the bracket 104 can be configured with any number of foam apertures 118, screw apertures 116, and/or supportive ribs 117. Persons of ordinary skill in the art will also appreciate that, due to the fact that the incision 110 is located outside of the recessed region 120, the bracket 104 may be wider than, perhaps substantially wider than, the recessed region 120.

Figure 8:
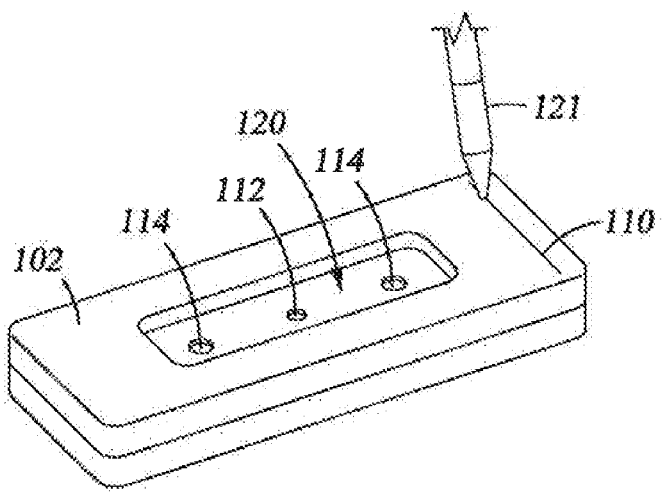
FIG. 8 is a perspective view depicting a skin being sealed.

In an embodiment, the incision 110 is sealed after the bracket 104 is inserted into the skin 102. FIG. 8 is a perspective view of an example of the incision 110 being sealed by a sealing device 121. The sealing device 121 may use heat, infrared or ultraviolet light, or radio frequency to seal the skin 102. One of the reasons for sealing the incision 110 is to prevent any leakage of foam from the skin 102 when the skin 102 is filled with foam. Another reason for sealing the incision 110 is to improve the aesthetic look of the foam product once its manufacture is completed. However, it may be unnecessary to seal the incision 110 because the incision 110 does not remove any material from the skin 102. Thus, the two sides of the incision 110 rejoin after the bracket 104 is inserted into the skin 102 and are able to retain all or substantially all of the foam within the skin 102 when the skin 102 is filled with foam.

Figure 9:
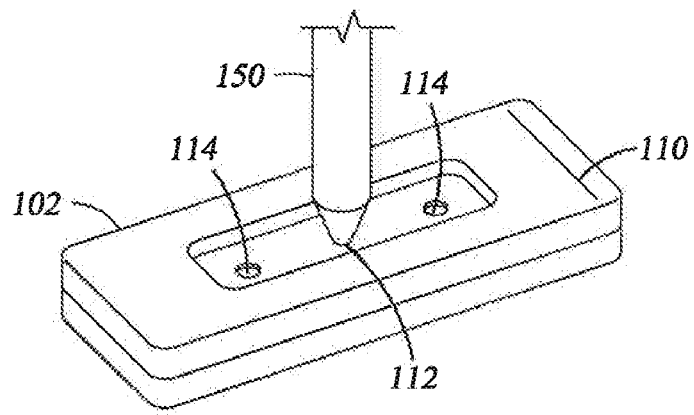
FIG. 9 is a perspective view depicting foam being inserted into a skin.

After the bracket 104 is inserted into the skin 102, the skin 102 is filled with foam per 97 of method 90. The foam may be any polymeric foam suitable for use in cushioning the foam product. For example, the foam may be polyurethane, PVC, PVA, polyethylene, styrene butadiene rubber (SBR), latex, or natural rubber, Regardless of its specific composition, the foam may be inserted into the skin using a foam injection nozzle 150. FIG. 9 is a perspective view showing a foam injection nozzle 150 being inserted into the skin 102 to insert foam into the interior of the skin 102. In one embodiment, the foam injection nozzle 150 passes through the aperture 112 created by the air injection needle 103. In another embodiment, some of the skin 102 surrounding the aperture 112 may be removed to accommodate foam injection nozzles 150 of larger diameters. The foam injection nozzle 150 injects a sufficient quantity of foam into the interior of the skin 102 to fill or substantially fill the skin 102 and secure the bracket 104 in place. Although not shown in FIG. 9, the foam injection nozzle 150 may pass through the foam aperture 118 in the bracket 104 to sufficiently fill the skin 102 with foam. Moreover, optional vent lines (not shown) may be inserted into the skin 102 to aid in the venting of air from within the skin 102 during the foam injection process. Finally, bracket positioning devices may also be employed by the Blow Mold and Backfill Manufacturing Process to aid in the positioning of the bracket 104 within the interior of the skin 102 during the foam filling process. Such bracket positioning devices may remain within the skin 102 or may be removed from the skin 102 once the foam is injected therein.

After the foam is injected into the slain 102, the foam is cured per 98 of method 90. The foam may be cured using any known foam curing process, such as heat, light, radiation, radio frequency, or time. Once the foam is cured, the foam product is complete and used for its intended purpose.

Figure 10:
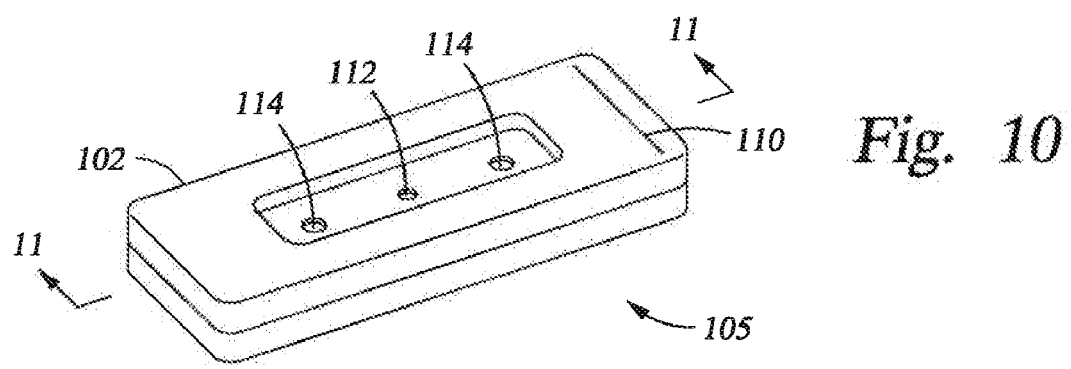
FIG. 10 is a perspective view of one embodiment of an armrest produced by the Blow Mold and Backfill Manufacturing Process.
Figure 11:
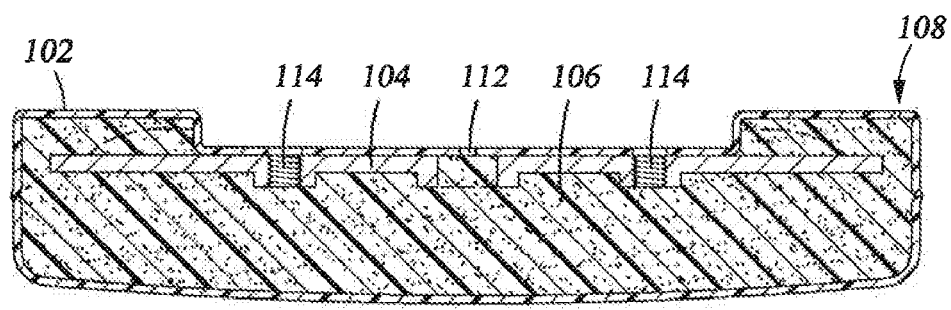
FIG. 11 is a cross-sectional side view, taken along section line 11-11 of FIG. 10, of the armrest produced by the Blow Mold and Backfill Manufacturing Process.

FIG. 10 is a perspective view of an example of the completed foam product, specifically an armrest 105, produced by the Blow Mold and Backfill Manufacturing Process. FIG. 11 is a cross-sectional side view of one embodiment of the armrest 105 produced by the Blow Mold and Backfill Manufacturing Process taken along section line 11-11 of FIG. 10. As can be seen in FIGS. 10 and 11, the armrest 105 comprises the skin 102, the bracket 104, and the foam 106. In addition, the exterior of the armrest 105 contains the aperture 112, the dimples 114, and the bracket insertion area 108. Once produced by the Blow Mold and Backfill Manufacturing Process, foam products may be used for a variety of purposes, such as an armrest 105 for an office-type chair.

Figure 12:
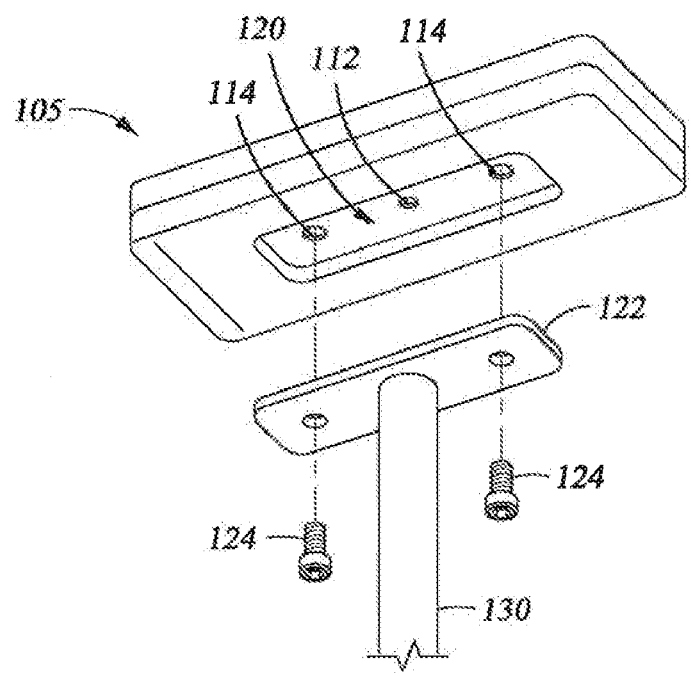
FIG. 12 is a perspective view of the armrest of FIG. 10 being attached to the arm of a chair.

If the foam product is an armrest 105, the foam product may then be attached to the arm of a chair per 99 of method 90. Generally, foam products manufactured using the Blow Mold and Backfill Manufacturing Process are suitable for office-type chair components. FIG. 12 is a perspective view of the armrest 105 being attached to the arm 130 of an office-type chair. The arm 130 of the chair contains a plate 122 that is sized and shaped to mate with the recessed region 120 of the armrest 105. Two self-tapping screws 124 are inserted through holes in the plate 122 and into the dimples 114 of the armrest. The screws 124 penetrate the skin 102 of the armrest 105 and mate with the screw apertures 116 in the bracket 104. Such a configuration eliminates the need to remove material from the underside of the armrest 105 to reveal the screw apertures 116 in the bracket 104. However, if desired, the Blow Mold and Backfill Manufacturing Process can be configured such that a portion of the skin 102 material is removed from the dimples 116 such that the screw apertures 116 are fully exposed and the screws 124 do not have to penetrate the skin 102 material.

Figure 13A:
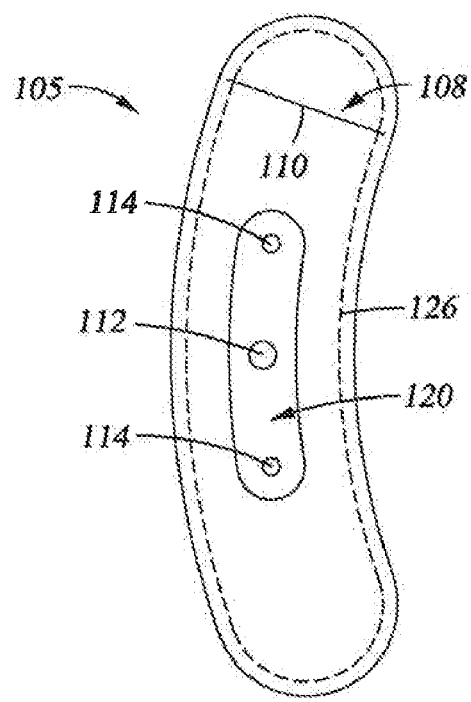
FIGS. 13A and 13B are plan views of two different embodiments of asymmetrical armrests produced by the Blow Mold and Backfill Manufacturing Process.
Figure 13B:
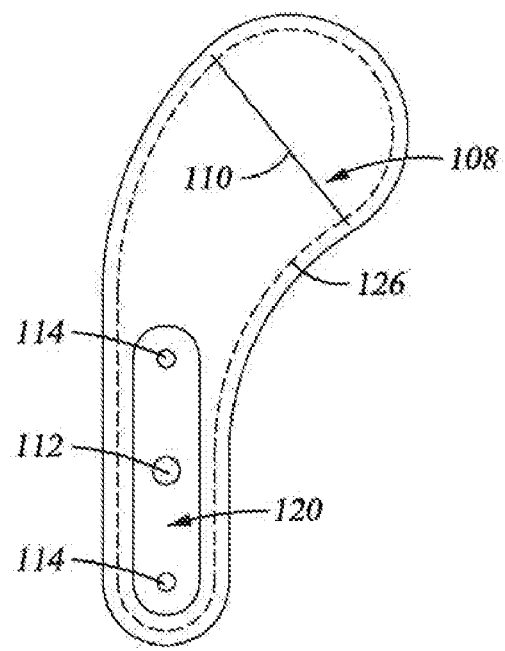

Another reason why the Blow Mold and Backfill Manufacturing Process is advantageous is because it allows manufacturers to produce asymmetrical foam products. Symmetrical foam products are defined as foam products capable of being divided into identical halves along a longitudinal plane. By contrast, asymmetrical foam products are defined as foam products that cannot be divided into identical halves along a longitudinal plane. FIGS. 13A and 13B are plan views of two different embodiments of asymmetrical armrests 105 produced by the Blow Mold and Backfill Manufacturing Process. More specifically, FIG. 13A is a plan view of the underside of a C-shaped armrest 105. Similarly, FIG. 13B is a plan view of the underside of a P-shaped armrest 105. The outline of the brackets 126 inside the armrests 105 are shown in phantom lines in FIGS. 13A and 13B. The location of the bracket insertion area 108 and incision 110 allow brackets 126 that are asymmetrical and/or wider than the recessed region 120 to be inserted into the interior of the armrest 105. Thus, the Blow Mold and Backfill Manufacturing Process allows armrests to be produced that could not be manufactured using the prior art methods.

While several embodiments of foam products and methods of manufacturing such products have been shown and described herein, modifications thereof may be made by one skilled in the art without departing from the spirit and the teachings of the disclosure. The embodiments described herein are exemplary only and are not intended to be limiting. Many variations, combinations, and modifications of the foam products and manufacturing methods disclosed herein are possible and are within the scope of the disclosure. Accordingly, the scope of protection is not limited by the description set out above, but is defined by the claims which follow, that scope including all equivalents of the subject matter of the claims.

What is claimed is:

1. A foam product comprising:
   a unitary skin wall surrounding an interior;
   a mounting area on an underside of the skin wall, the mounting area having a width and a length, and the mounting area being configured to mate with a mounting assembly attached to an article of furniture;
   an incision on the underside of the skin wall, the incision separate from the mounting area;
   a bracket positioned within the skin interior; and
   foam substantially filling the skin interior and securing the bracket in place within the skin wall;
   wherein the underside of the skin wall has a width; the incision has a width; the width of the mounting area is less than the width of the underside of the skin wall; the width of the incision is less than the width of the underside of the skin wall; and the width of the incision is greater than the width of the mounting area.

2. The foam product of claim 1, wherein the incision forms a closable slit in the skin wall; wherein the incision is positioned outside of the mounting area; and wherein the incision allows skin distortion to form an opening for inserting the bracket into the skin interior upon application of pressure, with the opening closing upon release of pressure.

3. The foam product of claim 1, wherein the incision is sealed shut before the interior of the skin is filled with foam.

4. The foam product of claim 1, wherein no material is removed from the skin wall to form the incision.

5. The foam product of claim 1, wherein at least a portion of the bracket is wider than the width of the mounting area.

6. The foam product of claim 1, Wherein the foam product is asymmetrical along a longitudinal plane of the foam product.

7. The foam product of claim 1, wherein the mounting area is recessed.

8. The foam product of claim 1, wherein the skin is formed from one of the following materials: polyvinyl chloride (PVC), polyvinyl acetate (PVA), polyurethane, polyethylene, polyester, leather, natural rubber, synthetic rubber, latex, or a thermoplastic elastomer(TPE).

9. The foam product of claim 1, wherein the bracket is configured and positioned within the skin interior to support a majority of the foam product, while allowing foam to occupy sufficient space between the bracket and the skin so the bracket is not readily detectible; and wherein the bracket is configured to be approximately the same shape but slightly smaller than the skin.

10. The foam product of claim 1, wherein the skin is formed of a thermoplastic elastomer, and wherein the foam is formed of one of the following materials:
   polyurethane, PVC, PVA, polyethylene, styrene butadiene rubber (SBR), latex, or natural rubber.

11. The foam product of claim 1, wherein the incision is sealed shut before the interior of the skin is filled with foam, and wherein no material is removed from the skin wall to form the incision.

12. The foam product of claim 11, wherein at least a portion of the bracket is wider than the width of the mounting area.

13. A foam product comprising:
   a unitary skin wall surrounding an interior;
   a mounting area on an underside of the skin wall, the mounting area having a width and a length, and the mounting area being configured to mate with a mounting assembly attached to an article of furniture;

an incision on the underside of the skin wall, the incision separate from the mounting area;

a bracket positioned within the skin interior; and foam substantially filling the skin interior and securing the bracket in place within the skin wall;

wherein the underside of the skin wall has a width; the incision has a width; the width of the mounting area is less than the width of the underside of the skin wall; the width of the incision is less than the width of the underside of the skin wall; the width of the incision is greater than the width of the mounting area; and the incision is located in a bracket insertion area, and the bracket insertion area is separate from the mounting area and is recessed.

14. The foam product of claim 13, wherein the skin is formed of cured TPE, setting the shape of the skin; wherein the incision forms a closable slit in the skin wall; wherein the incision allows skin distortion to form an opening for inserting the bracket into the skin interior upon application of pressure, with the opening closing upon release of pressure; and wherein the incision is sealed shut before the interior of the skin is filled with foam.

15. The foam product of claim 13, wherein at least a portion of the bracket is wider than the width of the mounting area.

16. A foam product comprising:

a unitary skin wall surrounding an interior;

a mounting area on an underside of the skin wall, the mounting area having a width and a length, and the mounting area being configured to mate with a mounting assembly attached to an article of furniture;

an incision on the underside of the skin wall, the incision separate from. the mounting area;

a bracket positioned within the skin interior; and foam substantially filling the skin interior and securing the bracket in place within the skin wall;

wherein the underside of the skin wall has a width; the incision has a width; the width of the mounting area is less than the width of the underside of the skin wall; and the width of the incision is greater than the width of the mounting area.

17. The foam product of claim 16, wherein the incision forms a closable slit in the skin wall; wherein the incision is positioned outside of the mounting area; and wherein the incision allows skin distortion to form an opening for inserting the bracket into the skin interior upon application of pressure, with the opening closing upon release of pressure.

18. The foam product of claim 16, wherein the incision is sealed shut before the interior of the skin is filled with foam, and wherein no material is removed from the skin wall to form the incision.

19. The foam product of claim 16, wherein at least a portion of the bracket is wider than the width of the mounting area.

20. The foam product of claim 16, wherein the skin is formed of cured TPE, setting the shape of the skin.

* * * * *

UNITED STATES PATENT AND TRADEMARK OFFICE
CERTIFICATE OF CORRECTION

| | |
|---|---|
| PATENT NO. | : 8,318,283 B2 |
| APPLICATION NO. | : 13/048449 |
| DATED | : November 27, 2012 |
| INVENTOR(S) | : James Hsu |

It is certified that error appears in the above-identified patent and that said Letters Patent is hereby corrected as shown below:

Column 1, Line 62, replace "than" with --that--

Column 3, Line 43, replace "in. the" with --in the--

Column 5, Line 7, replace "the skin 102 with" with --the skin 102 with air.--

Column 5, Line 54, replace "Why" with --why--

Column 10, line 4, replace "from. the" with --from the--

Signed and Sealed this
Nineteenth Day of February, 2013

Teresa Stanek Rea
*Acting Director of the United States Patent and Trademark Office*